Aug. 1, 1967     H. LAUFFER ETAL     3,334,162
PROCESS AND APPARATUS FOR LINING PRESSURE GALLERIES
Filed Aug. 19, 1964     5 Sheets-Sheet 1
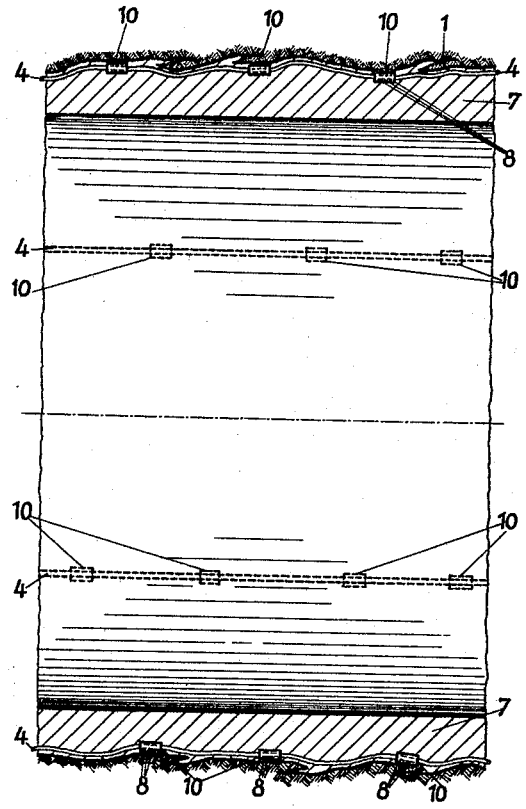
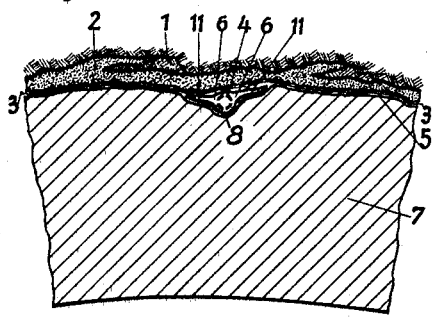
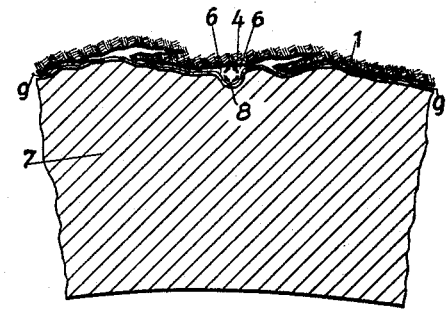

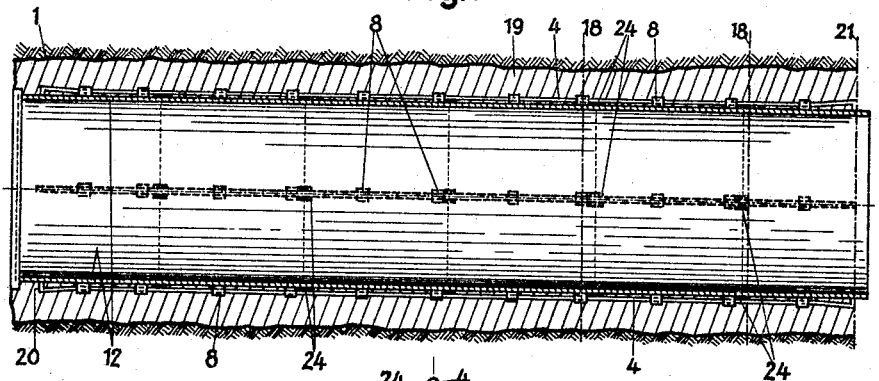
Fig. 7
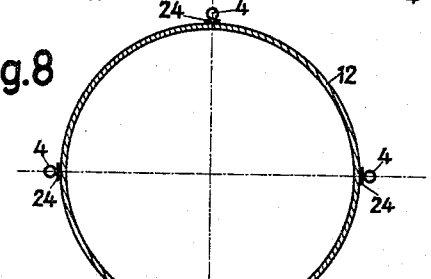
Fig. 8
Fig. 9
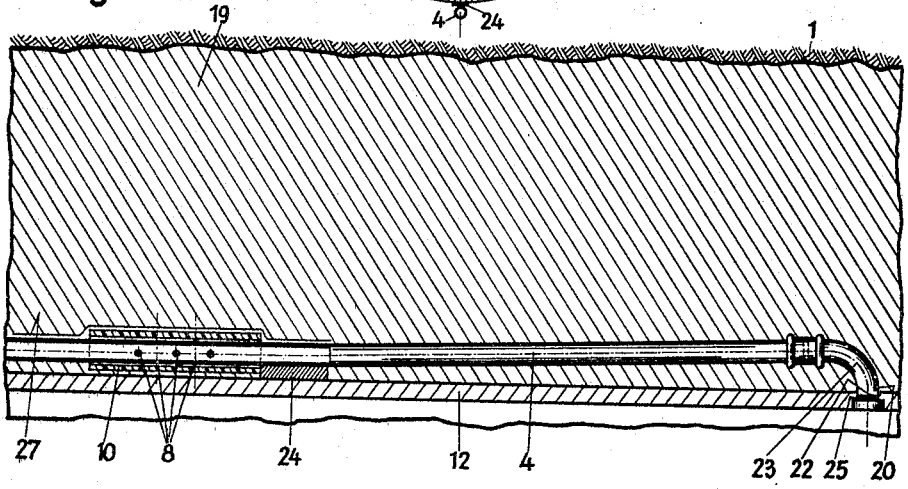

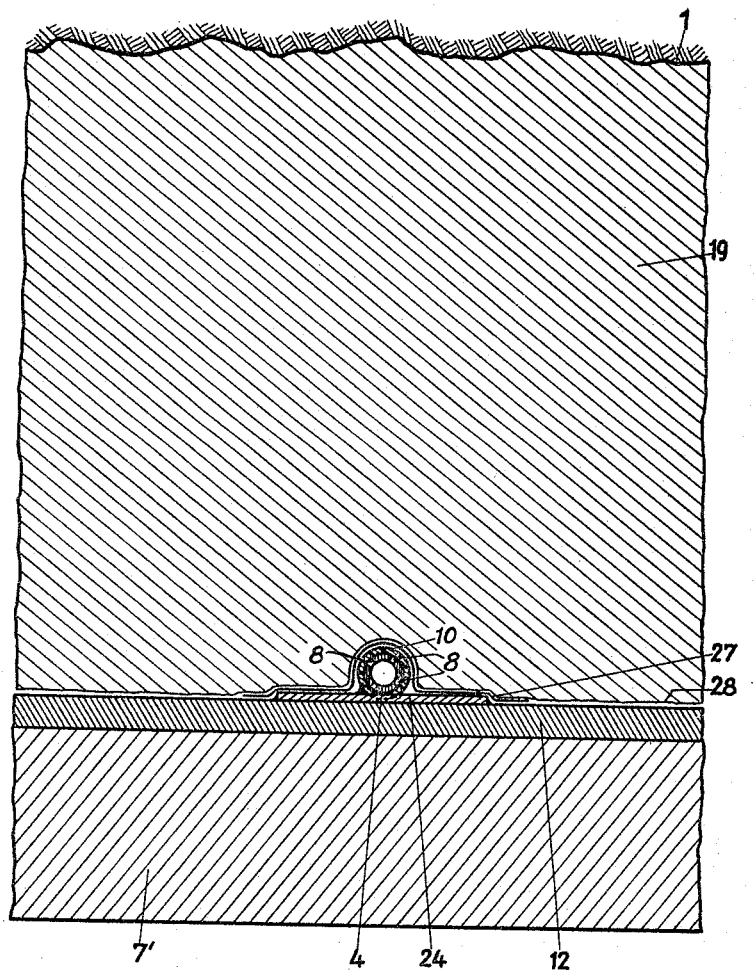

3,334,162
PROCESS AND APPARATUS FOR LINING PRESSURE GALLERIES
Harald Lauffer, 48a Hungerburg, Innsbruck, Austria;
Gerhart Seeber, 8 Rudolfstrasse, Solbad Hall, Austria;
and Franz Kaindl, Prantauerweg, Landeck, Austria
Filed Aug. 19, 1964, Ser. No. 390,689
Claims priority, application Austria, Aug. 23, 1963,
A 6,772/63, A 6,776/63
7 Claims. (Cl. 264—32)

The invention relates to a process for lining pressure galleries, pressure shafts, etc. using a lining body.

According to a known process of this type a core ring having a uniform cross-sectional shape along its entire length is installed with an allround clearance from the wall of the excavation and subsequently some pressure medium is introduced to exert an external pressure on the outer face of the core ring. The pressure medium used in this instance is cement mortar which is introduced under high pressure into the cavity between the excavation and the outer face of the core ring and exerts on the latter a compressive stress which should exceed the value of the tensile stresses acting on the core ring when the pressure gallery is in operation. Because of the very high consumption of cement mortar in this process due to the inevitable irregularities of the excavation wall a modified process has been suggested according to which, before inserting the core ring, the excavation is lined with a lining ring the inside of which is adjusted to the core ring so that between the core ring and the lining ring a regular annular space having the same radial dimension all round is maintained. Into this annular space of relatively small volume the cement mortar is introduced. The cost reduction in cement mortar mass so achieved is set off by the expense involved in making the lining for which—apart from the form required for the core ring—a separate second form is needed.

The use of cement mortar as a pressure medium provided in the known processes has, moreover, a fundamental disadvantage, i.e., the setting of the cement mortar is already completed for some time when plastic deformations of the core ring and the rock are still taking place. The consequence is an unintended, but inevitable reduction of the compressive stress originally imparted to the core ring on introduction of the cement mortar. This later reduction may be very important under unfavorable conditions.

The shortcomings of these known processes are prevented according to this invention by providing the excavation with a lining body, subsequently pressurizing injection conduits mounted between the wall of the excavation and the lining body and discharging from these injection conduits grout material into the interstice between the excavation and lining body.

Particularly, the invention can be applied in such a way that the injection conduits are pressurized to such an extent that the lining body is subjected to a radial stress counteracting the radial pressure which is developed in operation.

According to a particularly advantageous application of the invention the pressure medium is discharged from the injection conduits provided between adjoining structural parts so that a gap forms between the respective structural parts and the widening of the gap so obtained is permanently secured by a secondary injection of a liquid or plastic filler.

Contrary to all prior suggestions the invention makes it possible to repeat the process once or several times when the structure is finished. It is characterized in that the discharge of the pressure medium and the secondary injection of the filler from the injection conduits are repeated at least once, if the radial prestress imparted to the lining body decreases. If the pressure gallery passes through yielding rocks, the compressive stress imparted to the lining body gradually decreases because of the prolonged yielding of the rock. Thus, the desired result of making the lining body provided, for instance, as a concrete ring safe against cracking will be lost.

Owing to the possible repetition of the process according to this invention a crack possibly forming after the construction has been finished will be again expanded by the pressure medium fed into it and this expanded gap will be sealed and blocked by the filler injected subsequently. This process can be repeated any number of times, even after great time intervals, so that the invention offers for the first time the possibility of considering continuously the deformations, particularly those of the rocks, after the lining body has been placed, and thus of guaranteeing permanently the compressive stress which should act on the lining body. With this possibility the invention offers great advantage over all heretofore known methods.

As injection material, water or thin laitance can be used as a pressure medium, and thick laitance or fine cement mortar as a filler.

Preferably, the injection conduits will be arranged in groups, section by section, and will be pressurized section by section.

The lining body can be constructed as a concrete ring inside the excavation or inserted into the excavation as a reinforcing tube preferably of metal. Furthermore, a concrete ring and a reinforcing tube can be combined to form the lining body.

In this case an advantageous embodiment of the invention will provide that the reinforcing tube be fitted into the gallery as the innermost member of the lining body before the latter is constructed, serving at the same time as a sacrifice form for the pouring of the concrete ring.

There are several possibilities of mounting the injection conduits. In one form of construction the injection conduits are fixed to the walls of the excavation—possibly provided with a coating of jetcrete—before the excavation is provided with the lining body. In another form of construction the injection conduits are fastened to the outer face of the lining body acting as the reinforcing tube. In this case the reinforcing tube serves as a support for the injection conduits and is inserted into the gallery in assembly therewith. The clearance between the rock and the reinforcing tube is filled with backfill concrete.

When using a concrete ring armored with a reinforcing tube as a lining body, the injection conduits can be provided between the rock and the concrete ring as well as between this concrete ring and the reinforcing tube and, particularly in using a thin-walled reinforcing tube, a further concrete ring fitting into the latter may offer some advantage.

The external compressive stress acting on the lining body before the pressure gallery is put into operation counteracts the tensile stress acting on the lining body by way of the pressure water passing through the pressure gallery when the operation is once started; the compressive strain forming in the lining body should exceed the tensile strain caused by the pressure water. Thus, formation of cracks is prevented in the lining body, if it is a concrete ring.

In a preferred mode of the process according to the invention, the wall of the excavation is coated with a separating layer preventing adhesion of concrete, and the lining ring is concreted directly to this separating layer, the injection conduits provided between the outer face of the lining and the rock being pressurized as soon as the lining ring has set. Before applying the separating layer the walls of the excavation may be provided with a jetcrete coating or a pre-coating to support the rock. The separating layer proper can be obtained by spraying the separating material onto the rock or by coating the same with a separating material. The separating layer adheres directly to the walls of the gallery, covering them directly. A further possibility consists, however, in using as a separating layer a film which is directly or indirectly applied to the rock in a suitable way, but which does not necessarily fit the same uniformly.

When the lining body is completed according to one of the alternatives described all structural components are closely fit to each other. Only subsequently a gap is formed by force using the pressure medium, the adhesion-preventing separating layer playing an important part. Since the only purpose of the separating layer is to secure a passage for the pressure medium entering by forming a crack, it becomes useless after completion of the process which may possibly be repeated several times. If desired, it is possible—according to a further characteristic of the invention—to add to the pressure medium a solvent acting on the material of the separating layer for dissolving the same.

The advantages achieved with regard to cost of construction and reduction of material as compared to the present state of technology are clearly evident.

A further object of the invention is to provide devices particularly adapted to perform the process according to the invention.

The most important of these devices is characterized by injection conduits provided inside the excavation which can be connected section by section with a grouting device, each conduit having spaced outlet openings for the grout material. The injection conduits are distributed in groups along the longitudinal and transverse section of of the excavation. The injection conduits can be arranged in the form of a spiral or in branched form. The outlet openings are formed as valves allowing the discharge of the pressure media and fillers, but preventing foreign bodies from entering the injection conduits. The injection conduits will be arranged usefully in such a way that they can be cleaned by flow-purging.

Moreover, it is advantageous to ensure a particularly effective grouting of the pressure medium and filler into the predetermined interstice by providing tubular sheathings with an internal diameter substantially exceeding that of the injection conduits round each injection conduit.

In the attached drawing several embodiments are shown diagrammatically.

FIG. 1 is a longitudinal section of a gallery according to one embodiment of the invention.

FIG. 2 shows in transverse section a sector of a gallery according to a second embodiment of the invention.

FIG. 3 shows a further embodiment in the same manner as in FIG. 2.

FIG. 7 is a longitudinal section of a further embodiment.

FIG. 8 is a detail in transverse section of the embodiment of FIG. 7.

FIG. 9 is an enlarged longitudinal section of a detail of the embodiment of FIG. 7.

FIG. 10 is a transverse section on enlarged scale through the embodiment of FIG.7.

Figure 4:
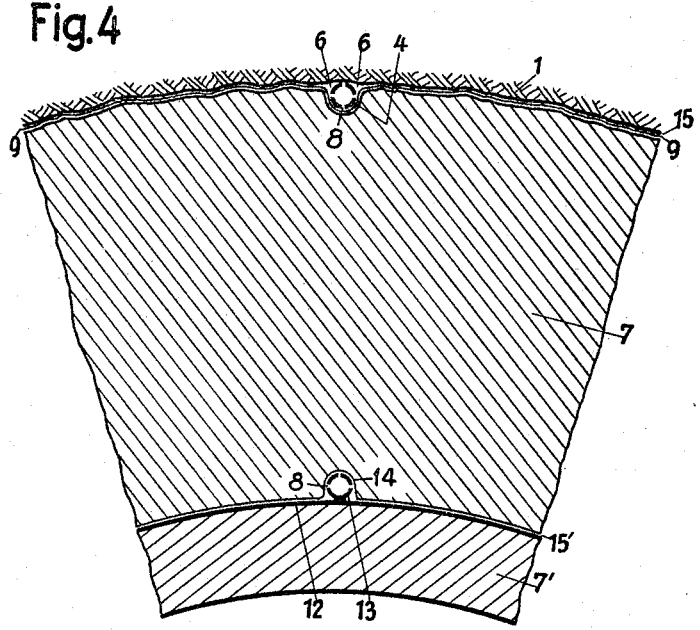
FIGS. 4 and 5 show two further embodiments in transverse sections.

The gallery section represented in FIG. 1 shows a series of injection conduits 4 running parallel to the axis of the excavation 1, which are preferably constituted by tubes of plastic material and are suitably fixed to the wall of the excavation. This fixation can be effected by clamping them to nails driven into the rock, by fastening them with adhesive, etc. Each injection conduit 4 has spaced outlet openings 8 for a grout material, e.g., first a pressure medium and then a filler. With flexible hoses 10 slipped over them the outlet openings are closed in such a way that the pressure medium and the filler are allowed to leave the conduit, but foreign bodies are prevented from entering and a possible reaspiration of grout material into the injection conduits 4 is made impossible. Hence, the members 8, 10 have the function of very simple outlet valves. In the embodiment shown, the lining body 7 is constituted by a concrete ring which fits directly in the excavation 1. As soon as the injection conduits are pressurized, a gap forms between the excavation 1 and the concrete ring 7 owing to the action of the pressure medium; this gap is expanded by a further increase of the pressure in the injection conduits and is then secured in this expanded state by the filling with grout which consequently sets. Thus, the concrete ring 7 is subjected to a pre-stress acting radially in the direction toward the center. When the grouting procedure is completed the injection conduits are purged with water. When out of use, the injection conduits 4 remaining in the structure are disconnected from the grouting device and closed. Until the following injection they remain filled with water. Thus, the injection conduits 4 are available for later supplementary injections which are desirable, if the pre-stress is reduced due to a change in the pressure conditions prevailing in the rock or the like.

The injection conduits are distributed in a suitable number along the longitudinal and transverse sections of the excavation. Particularly, they can be arranged parallel to the axis of the gallery or in planes at right angles of the axis or in a spiral.

According to FIG. 2, with the sole object of supporting the rock onto the excavation 1 with its natural irregularities the coating 2 can be applied as a thin layer whose inner layer conforms with the irregularities of the excavation 1. In a further stage of the process according to the embodiment, to this coat 2 a separating layer 3 is applied which prevents adhesion with the material of the lining body. This separating layer 3 can be a bitumen coating, a whitewash spray, a coating of dispersion paint, etc.

Then, the injection conduits 4 are mounted. When a suitable form has been built, the concrete ring 7 is poured. Its outer face 5 is first in direct contact with the separating layer 3 and the injection conduits 4, respectively. When pressure water is introduced through these conduits by force, first in the zones 6 around the outlet openings 8 a gap forms between the separating layer 3 and the outer face 5 of the concrete ring 7, which will be expanded under the effect of the pressure water over the entire outer face 5. If injection conduits 4 are distributed along a certain tunnel section, gap formation will take place in this entire tunnel section. The subsequent injection of a filler, for instance, a thick laitance, through the injection conduits effects a permanent and solid filling of the annular gap surrounding the concrete ring 7, thus guaranteeing a permanent radial compressive stress acting on the ring in the direction toward its center.

The injection conduits 4 can be encased at least in the zone of their outlet openings 8 in plastic sheathings 11. Their diameter is much larger than that of the injection conduits 4, thus protecting them against an unintended obstruction of the outlet openings 8 so that the functioning of the injection conduits and their outlet openings is guaranteed when the pressure medium is admitted. The advantageous use of plastic sheathings 11 may be restricted to the range of the slipped-on hoses 10 or be provided along the entire length of the injection tubes 4. The application of plastic sheathings 11 may render special separating layers unnecessary, if the plastic sheathings are arranged flatly overlapping each other inside the excavation, thus acting themselves as separating layers.

In the embodiment shown in FIG. 3, the unsupported wall of the excavation is such that a protection 2 is not required. The separating layer could be directly applied to the walls of the excavation 1, if used, as in the embodiment represented in FIG. 1, by spraying or coating. As an alternative possibility, a film 9 is provided as a separating layer as shown in FIG. 3. If a film is used, preferably, the injection conduits 4 are first mounted on the walls of the excavation 1—without or with a protection such as 2. Only then is the separating film 9 applied and subsequently the concrete ring 7 is concreted to the separating film 9. In this embodiment, the injection conduits 8 run between the excavation 1 and the separating film 9.

It is evident that the desired gap formation and compressive effect are obtained in this case, too, where the pressure medium and subsequently the filler are fed between the excavation 1 and the separating film 9.

In the embodiment shown in FIG. 4 a film 9 is again applied as a separating layer to the walls of the excavation 1. The injection conduits 4 are placed between members 1 and 9. The pressure medium discharged from the injection conduits acts in the way described for FIG. 3. In FIG. 4, the gap formed is designated with the numeral 15.

In the embodiment represented in FIG. 4 the lining body is composed of a concrete ring 7 and the reinforcing tube 12 placed inside the ring. Thus, the reinforcing tube 12 is enclosed from both sides in the mass of the concrete ring made up of the two zones 7 and 7'. Along the outer face of the reinforcement 12 additional injection conduits 13 are arranged with spaced outlet openings 8 acting as valves owing to slipped-on soft rubber sockets. In the concrete ring 7 recesses 14 can be provided for these injection conduits 13, if no other suitable measures are taken to ensure the gap-forming and gap-expanding effect of pressure medium and filler.

Figure 5:
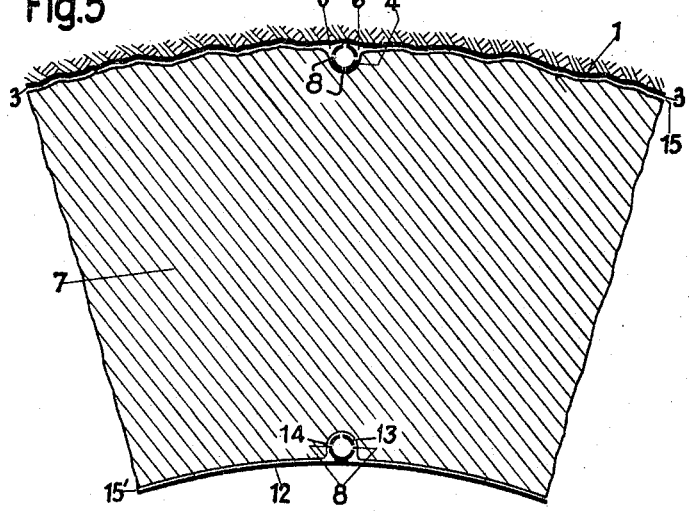

In the embodiment shown in FIG. 5 the separating layer is formed as a coating 3 covering the walls of the excavation 1. The reinforcing tube 12 represents in this embodiment the innermost part of the entire lining. If the reinforcing tube 12 is first mounted inside the excavation 1, it serves as a sacrifice form for the concrete ring 7.

If, after the concrete ring 7 has set, a pressure medium and subsequently a filler are introduced additionally into the gap 15' formed between members 7 and 12, owing to the high pressure in the interstices 15 and 15' an absolutely jointless binding is achieved with the parts encasing the concrete ring 7 or encased by this ring. All structural parts of the lining act as a unit with the rock.

Figure 6:
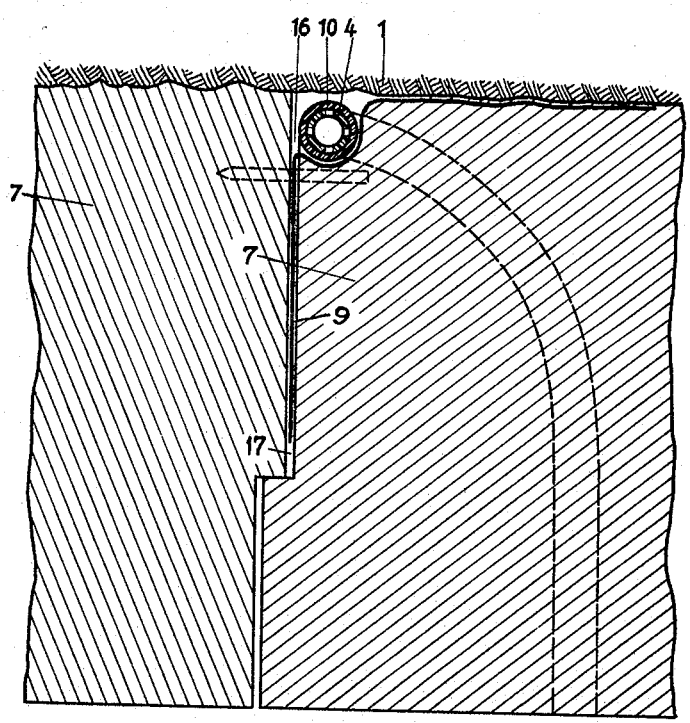
FIG. 6 shows a detail in longitudinal section.

According to FIG. 6, injection conduits 4 are additionally used to obtain an absolute sealing of the joints 17 of concrete rings 7, if these concrete rings 7 are produced in successive tunnel sections. In a recess 16 in a joint between two sections, an injection tube 4 is provided. When it is pressurized the grout is forced through the outlet openings (not represented in the drawing) into the joint 17 and effects tight fitting of the concrete rings 7 against each other and against the wall of the excavation in the region of the joint. In this embodiment, into at least part of the preferably stepped joint 17 a film 9 is inserted which extends around the injection hose 4 into the gap between the concrete ring 7 and the excavation 1.

In the embodiment shown in FIGS. 7 to 10 the lining body is exclusively composed of a preferably metallic reinforcing tube 12 and backfill concrete 19 which fills the interstice between the reinforcing tube 12 and the excavation 1.

The reinforcing tube 12 is equipped on its outer face with the injection conduits 4, before it is introduced into the excavation 1. For this purpose mounting supports 24 can be provided. The injection conduits 4 can be made of plastic, steel, or some other appropriate material. The mounting supports 24 can be formed as clamps. In the embodiment, the injection conduits 4 are provided as iron injection tubes. The mounting supports 24 are in this case—as is particularly evident from FIGS. 8, 9 and 10—supporting plates already welded to the reinforcing tube 12, before the latter has been subjected to a possibly provided stress-relief heat treatment. The injection tubes 4 themselves can be welded to the mounting supports 24 provided as supporting plates, since the reinforcing tube 12 is virtually not affected by this process.

From FIG. 7 it is evident that with the represented paraxial run of the injection conduits 4 the mounting supports 24 are placed in planes 18 at right angles to the tunnel axis. Moreover, FIG. 7 shows the outlet openings 8 acting as valves and the arrangement thereof. They, too, are provided in planes 18 at right angles to the axis and are at least partly within the range of the mounting supports 24 so that they fit closely the reinforcing tube 12. From FIGS. 9 and 10 the slipped-on tubes 10 of elastic material are evident which are provided to make the outlet openings 8 function as valves.

The outlet sockets 20 of the injection conduits 4 are equally placed in planes 21 at right angles to the axis (FIG. 7). The injection conduits 4 run at the outer face of the reinforcing tube 12 and are introduced together with the latter as a prefabricated element into the gallery. If the reinforcing tube 12 is thin-walled, it can be introduced into the gallery in rolled state and then be expanded to the diameter provided in the course of the assembly.

In order to provide the possibility of using with iron injection conduits 4 standard bends 23 and feed sockets 20 passing at right angles through the wall of the reinforcing tube, FIG. 9 shows the run of the injection tubes 4 starting from the feed sockets 20 with a slight gradient toward the outer face of the reinforcing tube 12 until they touch the latter in the region of a mounting support 24. The feed socket 20 passes through a bore 22 provided in the reinforcing tube 12 (FIG. 9). The locking plug 25 of the feed socket 20 must be removable so that supplementary grouting can be effected.

From FIGS. 7, 9 and 10 the backfill concrete 19 is evident. Assuming a thin-walled reinforcing tube 12, FIG. 10 shows an inner concrete ring 7'. The outlet openings 8 of the injection conduits 4 are preferably covered with a film 27 (FIGS. 9, 10) which may consist of plastic and which extends in this embodiment into the interstice 28 between the reinforcing tube 12 and the backfill concrete 19 of the reinforcement so that the complete filling of this interstice with the grout is ensured.

In all embodiments described, the grout material from the injection conduits not only causes the gap formation and the radial pre-stressing of the structural parts, but it also produces consolidation of the rock so that it is improved as an abutment, since the grout material is pressed into the fissures and cracks of the rock which is loosened, particularly, in the excavation zone, and establishes a state of equilibrium with the pressure of the superimposed rock.

The use of prefabricated elements described for the case where the lining body is constituted as a reinforcing tube can be provided in the same way when the lining body is formed as a ring of reinforced or non-reinforced concrete, asbestos cement, plastic, or other suitable material.

The invention is not at all restricted to the embodiments specified and represented, but may be utilized in other ways not limited to pressure galleries; it may be applied to pressure shafts, surge tanks or other fortification chambers wherein the invention offers the same advantages as described for pressure galleries.

What we claim is:

1. In a process of lining the walls of excavations, said process comprising forming injection conduits along the walls of an excavaton, inserting a reinforcing tube into the excavation in spaced relation with the walls thereof, pouring concrete between the tube and excavation walls such that the reinforcing tube and concrete upon setting form a lining body, conveying pressure fluid through the injection conduits and discharging the fluid between the excavaton walls and the outer surface of the lining body to form a gap therebetween and exert radially inward pressure on the lining body and radially outward pressure on the walls of the excavation, and then introducing a settable substance into the gap thus formed so that said substance sets in said gap and maintains the pressure on the walls of the excavation and the lining body.

2. In a process as claimed in claim 1, wherein a plurality of lining bodies form individual abutting longitudinal tunnel sections, the process further comprising sealing the joints between adjacent tunnel sections by forming injection conduits therebetween and conveying pressurized filler material between the sections.

3. A process as claimed in claim 1, wherein injection conduits are fastened to the outer face of the reinforcing tube before the latter is introduced into the excavation.

4. A process as claimed in claim 1, wherein the wall of the excavation is covered with a separating layer which prevents adhesion of concrete, the injection conduits being on said separating layer between the outer face of the concrete and the walls of the excavation and being pressurized as soon as the concrete is set.

5. A process as claimed in claim 1, wherein the pressure fluid is water and the settable substance is fine cement mortar.

6. A process as claimed in claim 1, wherein on decrease of the radial pressure imparted to the lining body, a subsequent injection of the settable substance is effected from the injection conduits.

7. Apparatus for lining the walls of an excavation comprising a plurality of endwise abutting lining bodies tightly fitted within the walls of such excavation, injection conduits extending lengthwise of said bodies between the walls of the excavation and the bodies and having spaced outlet openings for discharging settable material under pressure between the bodies and the wall to form a gap between the walls and said bodies and exert pressure on the wall and the lining bodies, each lining body being constituted by a concrete ring with a reinforcing tube on the inner surface thereof, and further injection conduits mounted on the reinforcing tube between the tube and concrete ring.

References Cited

UNITED STATES PATENTS

| 2,148,783 | 2/1939 | Spaulding | 61—45 |
| 2,208,302 | 7/1940 | Fernandez | 61—45 |
| 2,753,220 | 7/1956 | Kemper. | |
| 2,899,820 | 8/1959 | Headrick | 52—744 XR |
| 3,194,853 | 7/1965 | Weise et al. | 52—744 XR |
| 3,260,020 | 7/1966 | Patin | 52—224 |

FOREIGN PATENTS 1,344,260  10/1963  France.

ROBERT F. WHITE, *Primary Examiner.*

ALEXANDER H. BRODMERKEL, *Examiner.*

J. A. FINLAYSON, *Assistant Examiner.*